UNITED STATES PATENT OFFICE.

EDUARD SPRÖNGERTS, OF FRANKFORT-ON-THE-MAIN, GERMANY, ASSIGNOR TO THE FIRM OF VEREINIGTE CHININFABRIKEN ZIMMER & CO., GESELLSCHAFT MIT BESCHRÄNKTER HAFTUNG, OF FRANKFORT-ON-THE-MAIN, GERMANY.

BROM-VALERIC-ACID MENTHOL ESTER.

No. 888,857.     Specification of Letters Patent.     Patented May 26, 1908.

Application filed November 25, 1907. Serial No. 403,791. (Specimens.)

*To all whom it may concern:*

Be it known that I, EDUARD SPRÖNGERTS, a subject of the German Emperor, and resident of Frankfort-on-the-Main, Germany, have invented certain new and useful Improvements in Brom-Valeric Compounds, of which the following is a specification.

This invention relates to a process of making alpha-brom-valeric-acid-menthol-ester and to the product produced by said process. The menthol-ester of brom-valeric-acid was not known heretofore. Its advantage consists in the fact, that it is free of the unpleasant odor and taste of the acid, while the sedative qualities of the valeric acid are increased by the bromin. The process of manufacturing the same consists in causing the acid itself, or the bromid of the same or the phenol-ester of the same to act on menthol.

Alpha-brom-valeric-acid-menthol-ester is a colorless oil, which is heavier than water, and which can easily be dissolved in alcohol, ether, chloroform and benzin, while it is insoluble in water. At a pressure of 20 millimeters and at a temperature of 162° to 167° centigrade it boils while being but slightly decomposed. By alcoholic potash the ester is easily saponified hydrobromic acid being simultaneously split off. The analysis of several compounds made showed, on an average, 29.09% of bromin, the formula

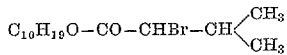

requiring 25.08% of bromin.

*Examples:*

1. 1 kilogram of menthol is heated in the water-bath during several hours with the same molecular amount, that is 1.565 kilograms, of brom-valeric bromid, or preferably with an excess of the same. The product of the reaction is washed with diluted ammonia, while cooling, whereupon it is distilled with superheated steam. After a slight fore-shot of menthene-like odor, pure ester is distilled over. The compound thus obtained is represented by the following equation:

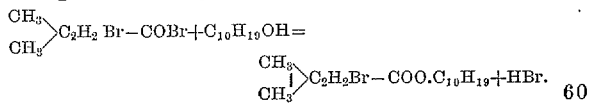

2. 1 kilogram of menthol is dissolved in 2 kilograms of pyridin whereupon 1.600 kilograms of brom-valeric-bromid are added little by little to the said solution while cooling. After the solution has stood for 12 hours, the product of the reaction is washed at first with a diluted solution of caustic soda, and afterwards with diluted hydrochloric acid, whereupon it is distilled with superheated steam.

3. 2 kilograms of brom-valeric acid and 1,600 kilograms of menthol are heated for 8 hours to 150° centigrade. The product of the reaction is washed with diluted alkali, and after drying it is fractionated *in vacuo*. At a pressure of 20 millimeters and at a temperature of 162° to 167° the brom-valeric-acid-menthol-ester is distilled over. The formation of the ester can be made more speedy by adding 50 grams of concentrated sulfuric acid or 400 grams of oxychlorid of phosphorus or by passing dry hydrochloric or hydrobromic acid gas into the solution. In these cases, it is sufficient to heat the mixture for several hours in the water bath.

4. 2 kilograms of brom-valeric-acid-phenol-ester are heated with a little more than the corresponding molecular amount, viz. 1300 grams of menthol for several hours in the oil bath to 180° to 190° centigrade, while adding a little caustic potash. The product of the reaction is treated as in Example 1.

Claims:

1. The herein described process of making alpha-brom-valeric-acid-menthol-ester, which consists in causing the alpha-brom-valeric-acid to act on menthol while subjected to heat, treating the reaction product with alkali, and distilling it by the action of superheated steam.

2. As an article of manufacture the herein described product called alpha-brom-valeric-acid-menthol-ester answering to the formula $$C_{10}H_{19}O-CO-CHBr-CH{<}^{CH_3}_{CH_3},$$

which compound is a colorless oil heavier than water and easily soluble in alcohol, ether, chloroform and benzin, while insoluble in water, and which at a pressure of 20 millimeters and at a temperature of 162° to 167° centigrade boils while being slightly decomposed.

In testimony whereof I have signed my name to this specification in the presence of two subscribing witnesses.

EDUARD SPRÖNGERTS.

Witnesses:
 JEAN GRUND,
 CARL GRUND.